May 2, 1939.   R. WILKINSON   2,156,612
AUTOMATIC GRAMOPHONE AND THE LIKE RECORD PLAYING DEVICE
Filed Sept. 23, 1936   10 Sheets-Sheet 1

Inventor:
Robert Wilkinson
By: Mason & Porter
Attorneys

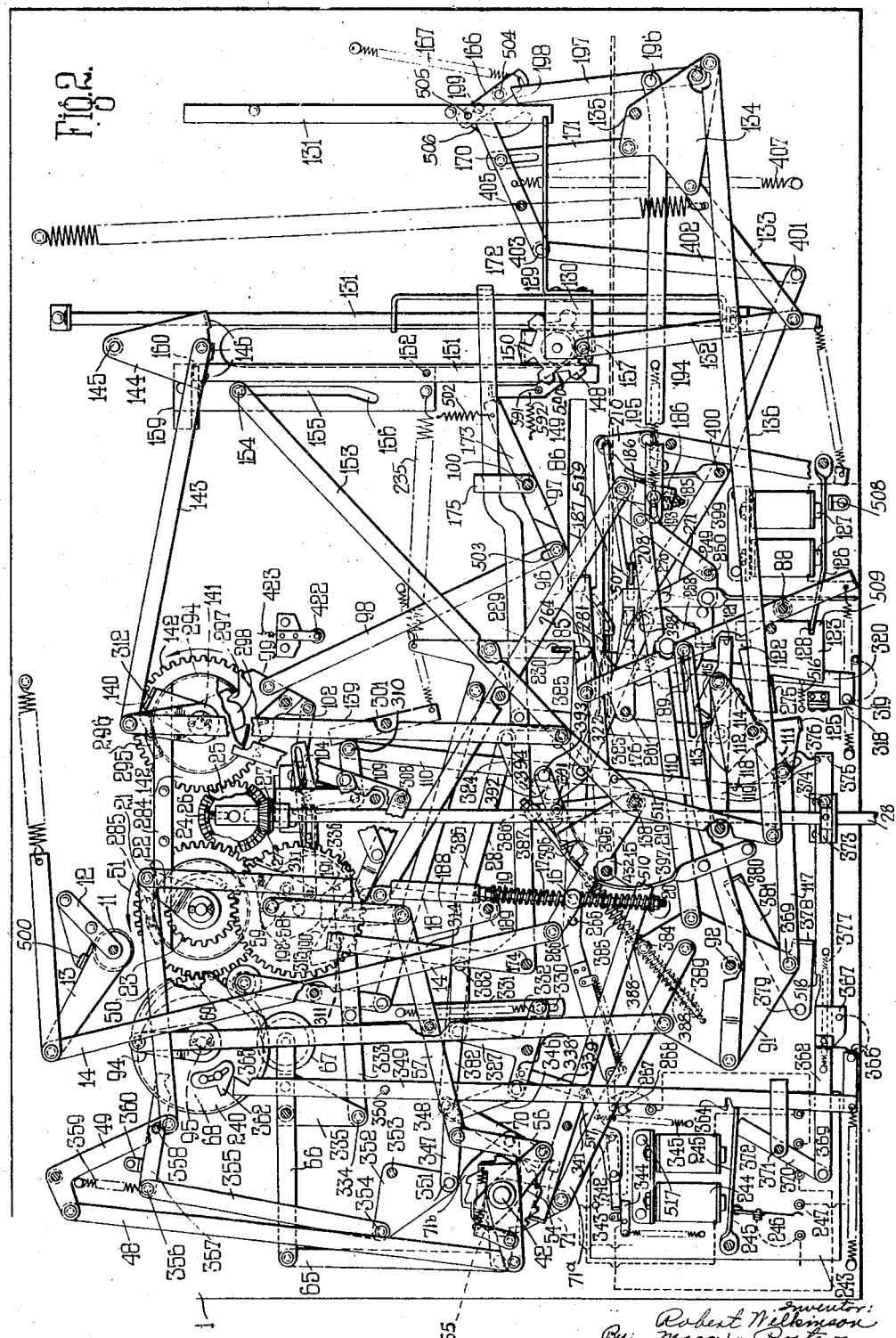

May 2, 1939.  R. WILKINSON  2,156,612
AUTOMATIC GRAMOPHONE AND THE LIKE RECORD PLAYING DEVICE
Filed Sept. 23, 1936  10 Sheets-Sheet 3
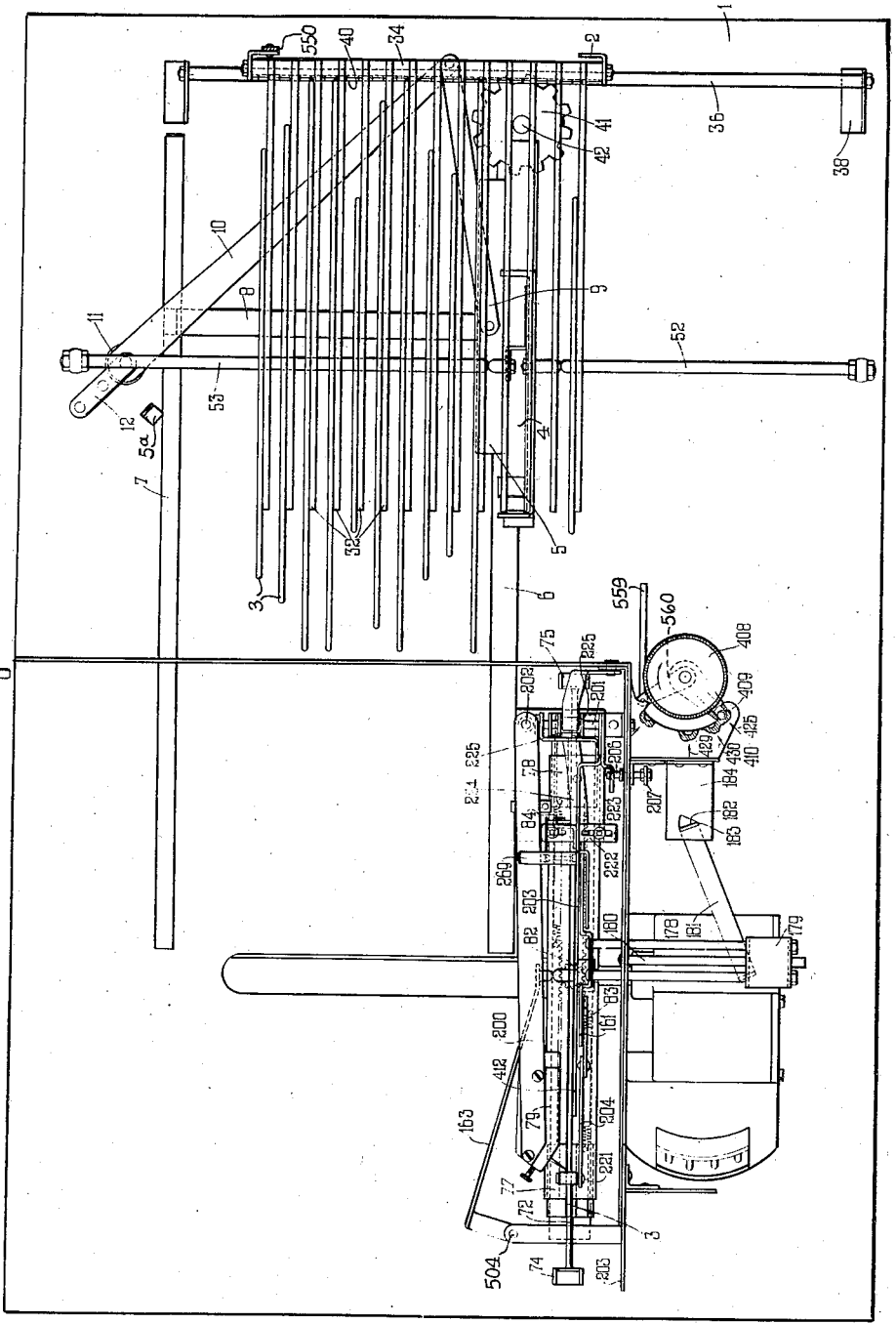

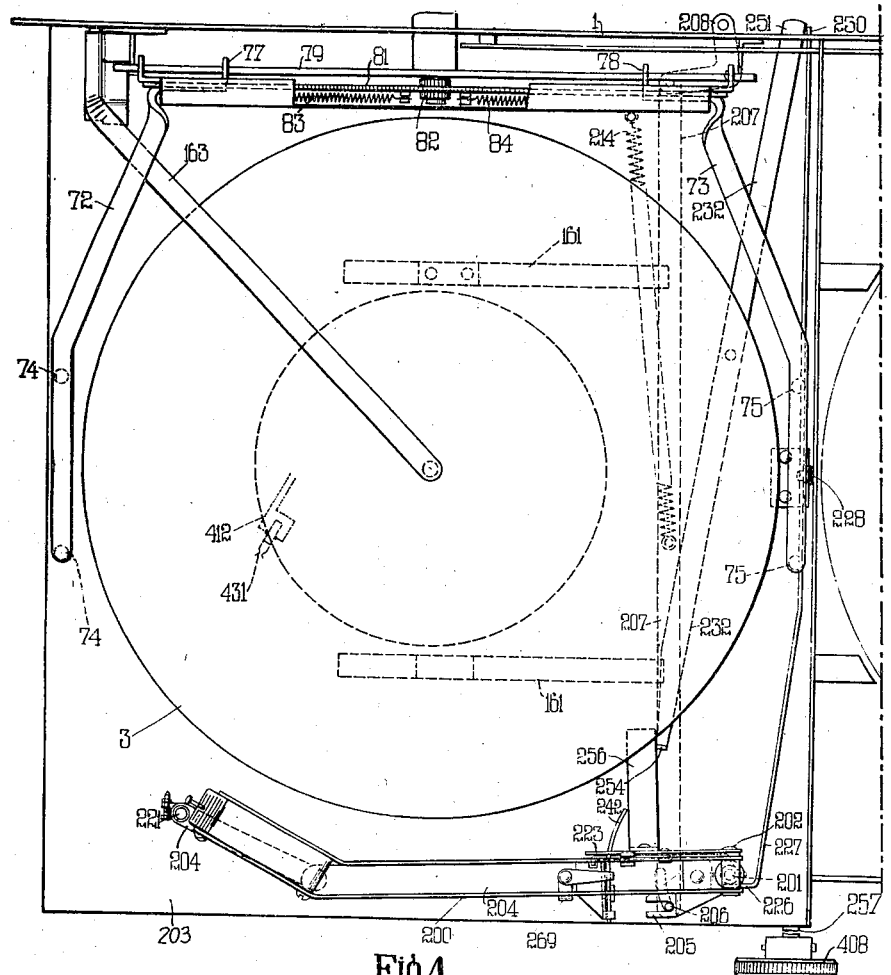

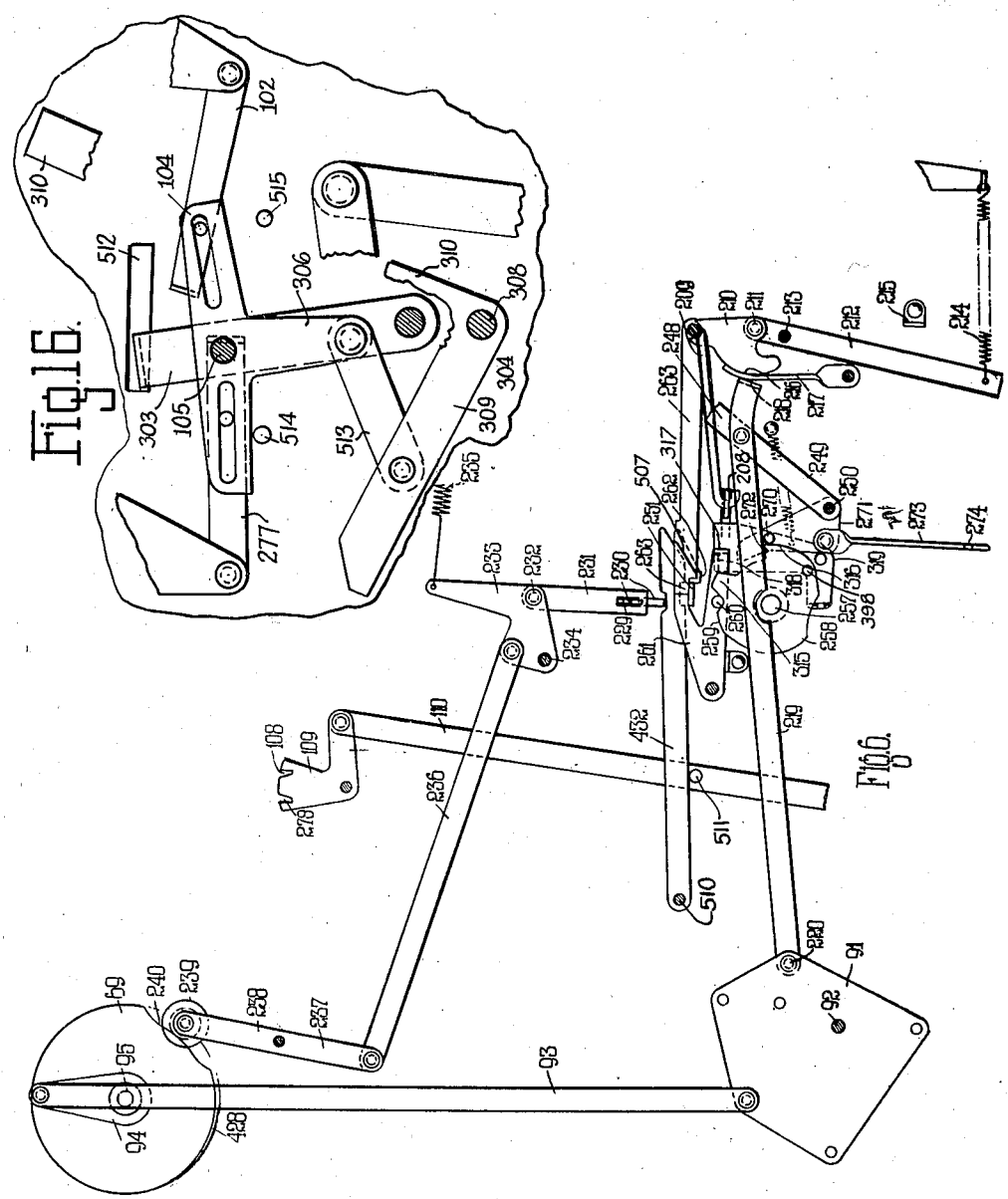

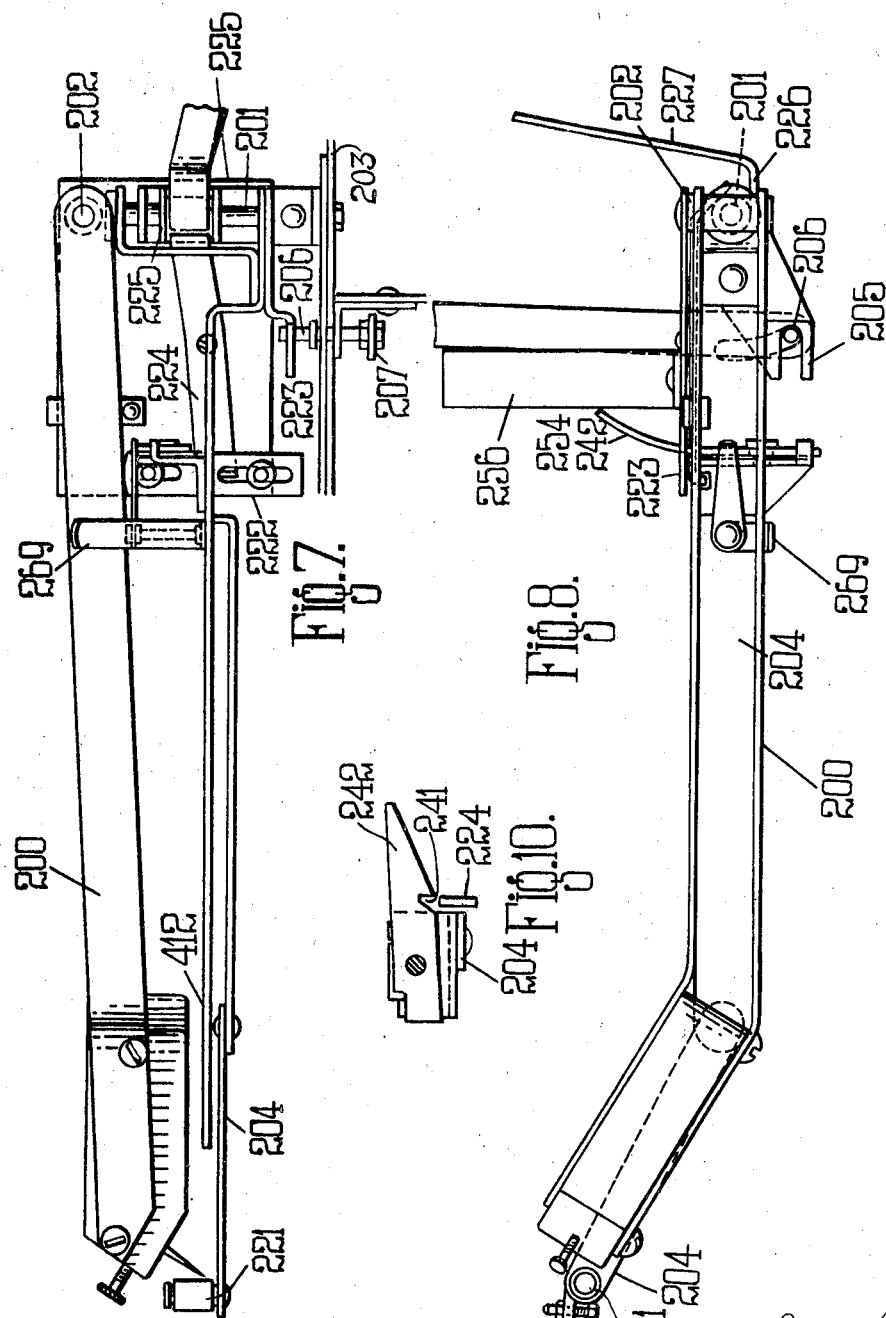

May 2, 1939.　　　　R. WILKINSON　　　　2,156,612
AUTOMATIC GRAMOPHONE AND THE LIKE RECORD PLAYING DEVICE
Filed Sept. 23, 1936　　　10 Sheets-Sheet 10

Inventor:
Robert Wilkinson
By: Mason & Porter
Attorneys

Patented May 2, 1939

2,156,612

UNITED STATES PATENT OFFICE 2,156,612

AUTOMATIC GRAMOPHONE AND THE LIKE RECORD-PLAYING DEVICE

Robert Wilkinson, Cheadle Hulme, England

Application September 23, 1936, Serial No. 102,239
In Great Britain September 26, 1935

10 Claims. (Cl. 274—10)

The present invention relates to improvements in automatic gramophone and the like devices.

An object of the present invention is to enable a number of records to be played in sequence either on one or both sides individually or consecutively, and any one or more records to be repeated or to be omitted from playing as desired; that is to say, that where a number of records are stored in the magazine of the machine, these may be played each on one side continuously, or each on both sides continuously, or certain on one side and certain on both sides, or again, any individual record may be repeated any number of times, or any records may be eliminated from playing in the predetermined sequence.

The machine, further, is of the type in which records are stored in the magazine to be taken therefrom, transferred to a turn-table played thereon, and restored to the magazine with or without reversal of the record and playing prior to storing therein.

According to the present invention the displacement of a record carrier for traversing records to and fro between the record turntable and a magazine, and the engagement with and disengagement from the said carrier, of a record, is effected by linkage operated from crank-elements by connection with a main driving shaft in a plane at right angles to the plane of the record turntable.

Similarly mechanism controlling the side for side reversal of the record may be provided consisting of linkage similarly operated from crank elements, and lying in a plane at right angles to the plane of the record turntable.

By this means, the whole mechanism for the various operations can be disposed in a very small space and further can be formed of a number of elements of strip metal, parts requiring machining being reduced to a minimum.

The invention is more particularly described with reference to the accompanying drawings showing one construction by way of example.

In the drawings:

Figure 2 is a corresponding elevational view.

Figure 3 is a front view of the machine.

Figures 4 and 4a are corresponding plan views.

Figure 6 is an elevation of the tone arm control mechanism.

Figure 7 is a front view on an enlarged scale of the tone arm and its carrier.

Figure 8 is a corresponding plan view.

Figure 10 is a detail of the tone arm catch.

Figure 16 is a detail view of the record reversal and replacement selector mechanism.

Figure 1:
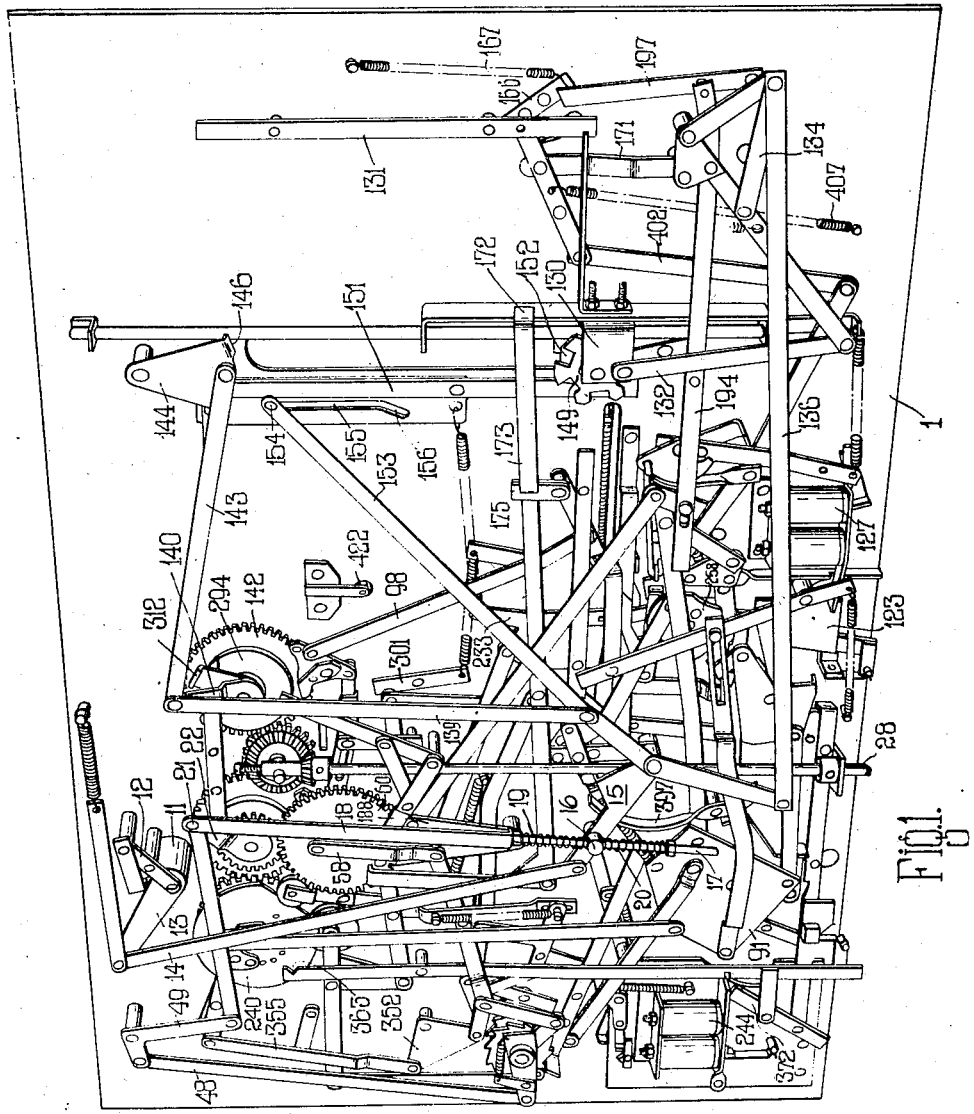
Figure 1 is a perspective view of the control mechanism at the rear of the machine.

The machine comprises a main frame 1 which supports on the one side control mechanism for the various devices to be operated in sequence, and on the other side, elements such as the magazine 2 and rotary turn-table supporting part 203.

Magazine

For transferring a record, such as 3, from the magazine to the turn-table or vice versa, there is provided a carrier 4 (Figs. 3 and 4) mounted on a guide 5 sliding on a fixed runway 6 mounted on the frame 1. An additional runway 7 may be provided co-operating with an auxiliary guide 8 riveted to or integral with the guide 5. A link 9 is pivoted at one end to the guide 5, and its opposite end to a crank arm 10 keyed to or integral with the sleeve 11 carried in bearings 12 on the frame 1, which sleeve 11 on the opposite side (see Figs. 1 and 2) has a crank arm 13 connected by a link 14 to a segmental arm 15 carrying a perforated stud 16 through which slides a spindle 17 with lost motion accommodated in both directions by springs 19, 20. This spindle 17 is carried on a link 18 pivoted at 21 at the end of a crank arm 22 integral with a gear wheel 23, which can be clutched at will to a second gear-wheel 24 co-axial with it, which is in constant driving connection with a pinion 25 integral with, or keyed to a bevel wheel 26 driven by bevel 27 on the vertical shaft 28, which forms the main driving shaft of the machine.

The frame 1, as shown, is in the form of a plate carrying the whole of the operating linkage which is described below.

Figure 4A:
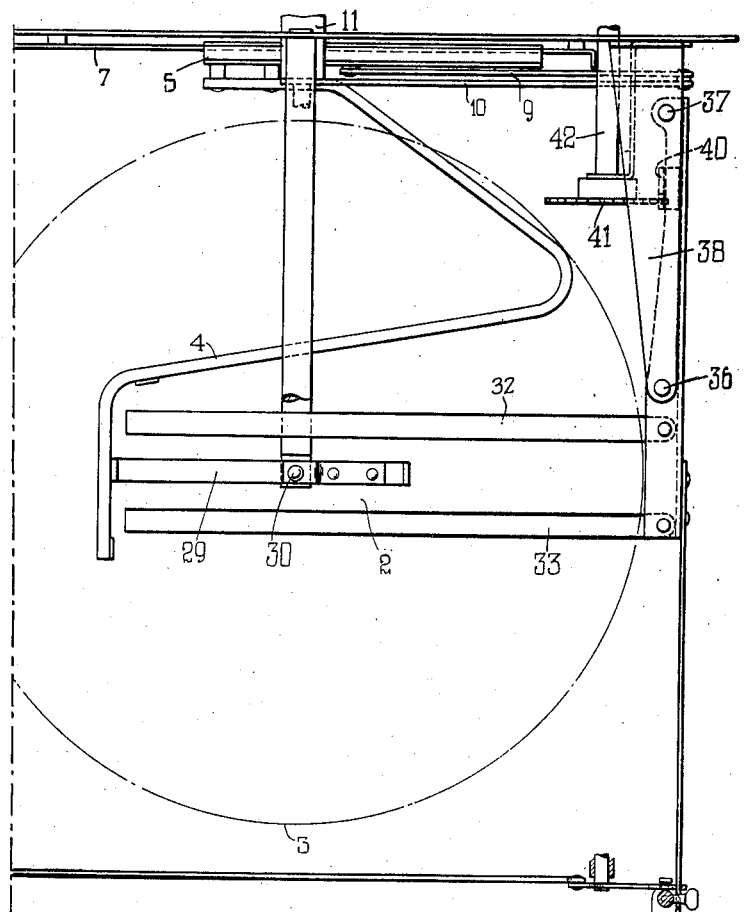

As shown in Figures 3 and 4, the record carrier 4 has an extension arm 29 disposed parallel to the guide-ways 5, 7 and carrying an upper pin 30 and a lower pin 21. The upper pin 30 for displacing a record from above the turntable into the magazine, whilst the pin 31 serves for displacing a record from the magazine to the turntable in the sequence of operations where records from a magazine are taken in desired sequence for playing operation on the turn-table and then returned to the magazine. In the case, however, where records are being stowed initially in the magazine in a predetermined sequence the functioning of the pins 31, 31, will be reversed; that is to say, the pin 31 will displace records into the magazine for stowage.

The record magazine comprises a plurality of pairs of fingers 32, 32 . . . and 33, 33 . . . carried rigidly upon spindles 34 and 35, respectively connected by a frame 450, 451 (see Fig. 5) which frame is displaceable in vertical guides 36, 37, carried by brackets 38, 39 dependent from the main frame 1 of the machine.

Figure 5:
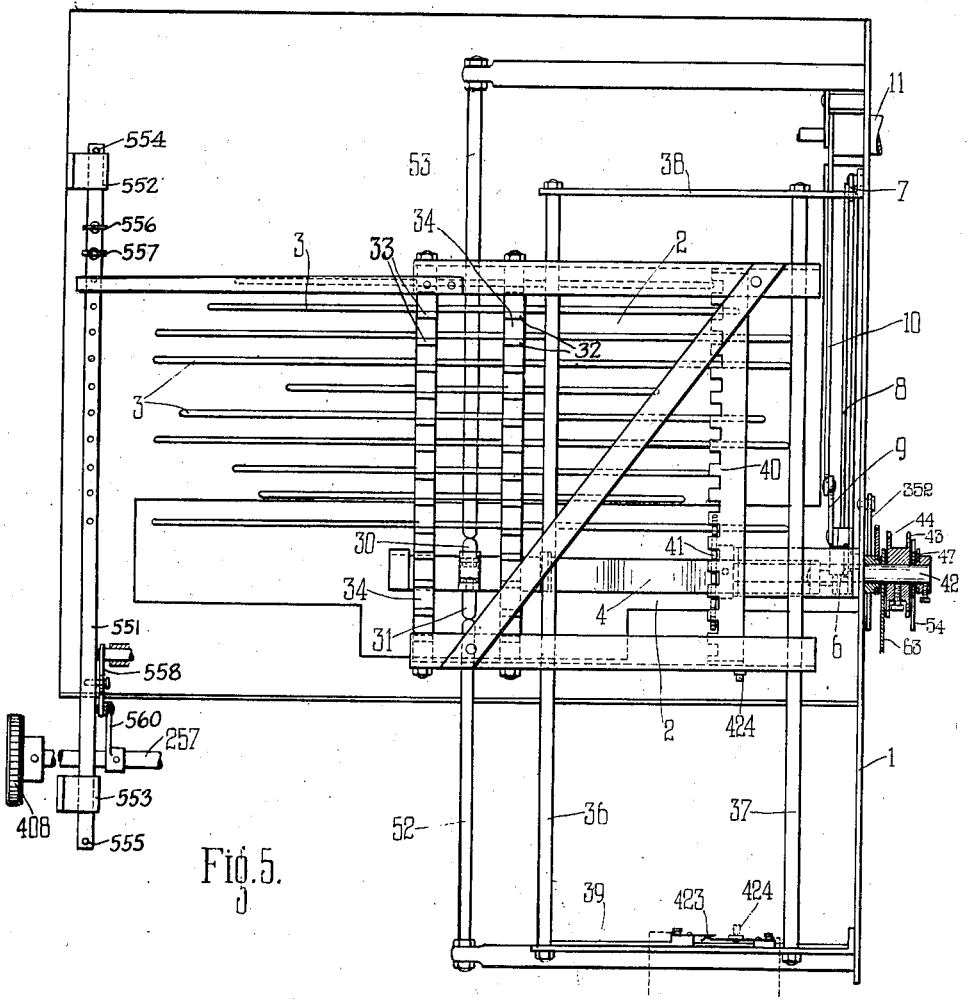
Figure 5 is an elevation looking on the magazine.

The vertical displaceable magazine 2 has further rigidly connected to it a displaceable rack bar 40, (Figs. 3, 4 and 5) meshing with a pinion 41 on a countershaft 42 provided with a main ratchet wheel 43 and auxiliary ratchet 44. (Figs. 2 and 5.) The main ratchet 43 serves for a step by step lifting of the magazine 2, whilst the auxiliary ratchet 44 serves for the step by step lowering of the magazine. A knob 408 controls by links (not shown) the operation of either ratchet 43 or 44 by their respective pawls.

A ratchet pawl 45 (Figs. 1 and 2) controlled by spring 46 is pivoted to a crank arm 47 rotating freely about a countershaft 42, which crank arm 47 is connected by link 48 to one arm of a bell crank lever 49 pivoted at its centre to the frame 1, the opposite end of which is pivoted to link 50 connected by pivot 21 on the crank arm 22.

In the position of the parts shown in Figures 2 and 4 the carrier 4 is disposed at its extreme position in the magazine with the crank arm 13 against the stop 500, and therefore, further rotation of the gear wheel 23 in the direction of the arrow 51 will, for an angularity of substantially 60°, cause no displacement of the carrier 4 either in one direction or the other, this motion being accommodated by reason of compression of the spring 20. Similarly, when the carrier 4 has reached the opposite end of its travel; that is to say, after a further 120° displacement in the direction of the arrow 51 the arm 10 (Fig. 3) will abut against stop 5a so that there will be no further motion of the magazine carrier 4, the movements of the links controlling it then being accommodated by compression of the spring 19 for a further 60°.

Disposed vertically between the pairs of fingers 32, 32 . . . and 33, 33 . . . is a vertical spindle 52 (Figs. 3 and 5) serving for the indexing of the records stored in the magazine for playing, and a second spindle 53 coaxial therewith, but oppositely disposed thereto and having its free end spaced from the free end of the spindle 52 for the indexing of the records which have been returned to the magazine by the carrier 4 after playing. Those spindles together extend over a length somewhat greater than twice the length of the spindle 34, 35 and being spaced apart sufficiently to permit the carrier 4 with its pins 30 and 31 to be inserted between them. This spacing, as will be seen, is exactly equal to the spacing between a pair of fingers 32, 33 and the next pair but two of fingers 32, 33. It may, however, be any other convenient exact, or approximate multiple of the distance between adjacent fingers 32, 32 and 33, 33.

On the countershaft 42 (see Figs. 1 and 2) a rocking lever 54 is provided, the outer end 55 of which is shaped to mask a ratchet gap in the main ratchet wheel 43, so that in one position of adjustment the feed pawl 45 on the lever 47 in its oscillation does not cause rotation of the ratchet wheel 43. This lever 54 is connected by a link 56 to one end of a pivoted lever 57, the opposite end of which is connected by a link 58 to a crank pin 59 on a pinion 60 in constant mesh with a pinion 23. The ratio of effective diameter of wheel 60 to wheel 23 is 2 to 1, so that it will consequently be seen that the ratchet wheel 43 is held out of effective operation for one revolution out of each two made by the wheel 23 with its crank arm 22 whereby the magazine displacement is held out of operation during ultimate revolutions of the crank arm 94 operating the reciprocation of the tone arm carrier 204, as will be more particularly described below. In order to support the weight of the magazine 2, a retaining pawl 61 is provided pivoted to the frame 1 of the machine, and either counter-weighted as shown, or under spring control.

In order to drop magazine with its arms 32, 32 . . . and 33, 33 . . . step by step the ratchet wheel 44 integral with the ratchet wheel 43 (Fig. 5) has a pawl (not shown) co-operating with it pivoted on an arm 63 oscillating about the countershaft 42, which arm 63, is displaceable by means of a link 65 (Figs. 1 and 2) pivoted to one end of a pivoted lever 66, the opposite end of which has a roller 67 engaging with an edge cam 68 keyed to, or integral with pinion 69 in constant mesh with pinion 24 connected through to the main driving shaft 28. A link 71a pivoted to the wrist plate 91 is pivoted at its opposite end to a plate 71b oscillating about the center of ratchet wheels 43, 44, which plate has a lever 70 pivoted upon it to act as a stop co-operating with a stop 71 on the retaining pawl 61, so that this is drawn out of engagement during such times as the pawl associated with the ratchet wheel 44 is in effective engagement with ratchet wheel 44 to take the weight of the magazine during its lowering, when the magazine is being loaded.

*Side for side reversal*

After any record 3 has been displaced from the magazine 2 into position over the turntable and reproduced, it may be turned automatically side for side for the playing of the second side prior to re-storage in the magazine. For this purpose a pair of arms 72, 73, (Figs. 3 and 4) are provided having extensions 74, 75 with cushioning fingers 76 for engaging the edge of the record at four points. These arms 72, 73, can move in towards one another in the plane of the record to grip the record or away from one another to release the record. The arms 72, 73, are carried upon slides 77, 78 respectively on a common guide 79. Each element 77, 78 carries a rack bar 80, 81 respectively engaging with a common pinion 82. Springs 83, 84, tend to draw the arms 72, 73 inwards towards one another. The pinion 82 ensures equal and opposite movement of the arms 72, 73.

The arms are displaced away from one another against the springs 83, 84, when those arms are in their lowermost position by means of a finger 85 sliding through a slot 86, (Fig. 2) in the frame 1 of the machine. This finger 85, as shown in Figs. 1 and 2, is cranked and pivoted at its outer end to a lever 87 oscillating about a pivot 88 on the frame 1, which lever 87 has a pin and slot connection 89 to a link 90 pivoted at its opposite end to a wrist plate 91 rotating about pivot 92 on the frame 1 of the machine. This wrist plate 91 receives its motion by connection to a pivoted link 93 pivoted at its outer end to a cranked arm 94 keyed to, or integral with the toothed wheel 69 rotating about axis 95.

Figure 11:
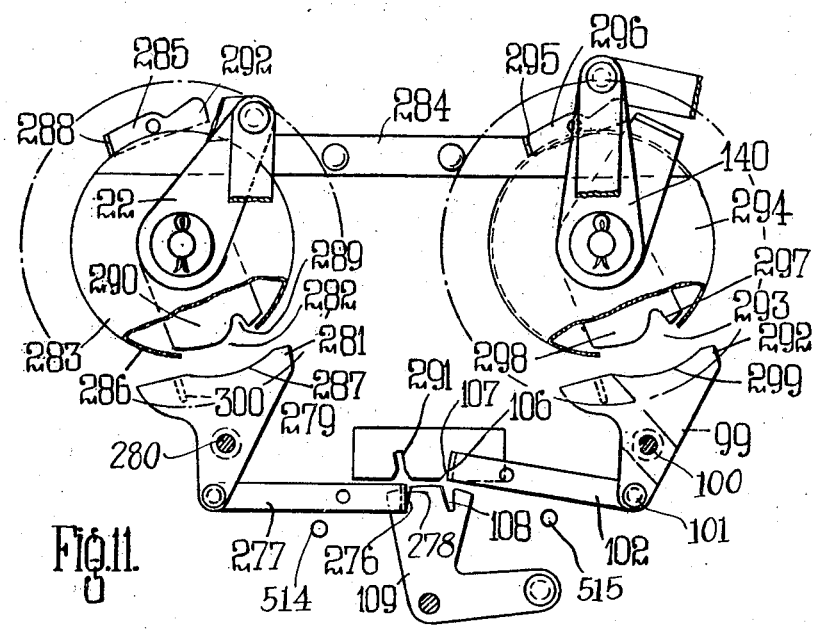
Figures 11, 12 and 13 are detail views of the clutch mechanism.
Figure 12:
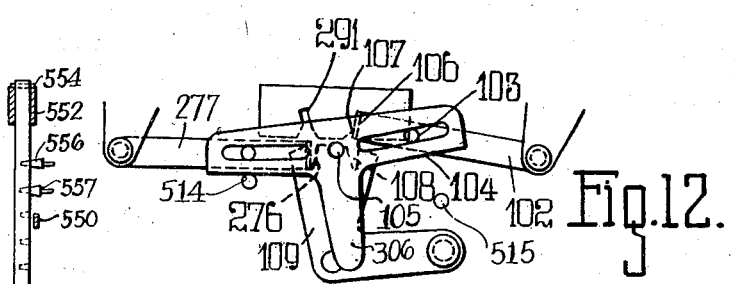
Figure 13:
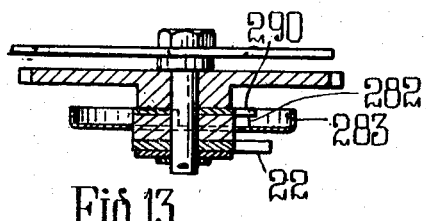

The arm 87 can be held out of effective operation whenever the end 96 of a pivoted arm 97 is drawn by spring 502 in front of the finger 85 which arm 97 is connected by a pin and slot 503 through a link 98 pivoted to a rocker plate 99 oscillating about a pivot 100 (Fig. 11) on the frame, which rocker plate has a pivotal connection 101 to a link 102 with a pin and slot connection 103 (Fig. 12) to a three-arm yoke 104, the oscillation of which about its pivot 105 (see Figs. 2 and 12) causes a projection 106 on the end of the link 102 either to enter a locking groove 107 in the frame of the machine, or alternatively, an operating notch 108 in the bell crank lever 109 connected by a link 110 (Fig. 2) pivoted at its lower end with lost motion to a rocking plate 111 pivoted at 112 to the frame 1, and which plate 111 has a pair of stop catches 113, 114, of which catch 113 co-operates with a pivoted pawl 115 on a second rocking plate 116, also oscillating about the same pivot 112, and connected by a link 117 to the wrist plate 91, whilst the second catch 114 engages around the side of this plate 116. The knob 408 is connected by links (not shown) to the yoke 104, so that in one position of the knob, a record will be returned to the magazine only after playing both sides in sequence, as will be more particularly described with reference to Figures 11, 12 and 13.

The plate 116 has a projection 118 adapted to engage under a pivoted lever 119 to swing this about its pivot 120 on the frame, and thus raise the pawl 115 out of engagement with the catch 113. The outer end 121 of this pivoted lever 119 may either move freely into an opening 122 in a pivoted plate 123 or rest upon a part 124 of this, according to whether the plate 123 is in the position shown in the drawings, Figure 2, or whether it is rocked about its pivot by means of a catch 125 on the rocker plate 116. This plate 123 may be held in its raised position by a pivoted finger 126, which may be integral with the armature of electromagnet 127, energised whenever it is desired to repeat a record. The plate 123 also has a tapered notch 128 forming a positive lock for this armature 126 in its raised position thus holding plate 123 in the position shown in Figure 2 until rocked by catch 125 of rocker plate 116 notwithstanding interruption of current through electromagnet 127.

The plate 123 is held in this position so that lever 119 cannot drop until plate 123 has been raised again by rocking of plate 116. Moreover, the mechanism must be locked when armature has been energised. One pressure on control button (circuit of armature 126) during playing sets the mechanism to repeat after playing. If this lock were not present one would have to hold the button down (hold the circuit closed).

The common guide element 79 supporting the record supporting arms 72, 73 is carried on a bush 129 rotatably mounted on a bracket 130 sliding on vertical guides 131 on the frame 1 of the machine. This bracket 130 is raised and lowered by means of a pivoted link 132 connected at its outer end to a crank arm 133 on a crank plate 134 pivoted at 135 to the frame, which crank-plate 134 has a pivotal connection to a connecting rod 136 pivoted to a bell crank lever 137, pivoted at 138 to the frame 1, the opposite end of which bell-crank lever 137 is connected by a link 139 to a crank arm 140 turning freely about the axis 141 of a gear wheel 142, but adapted to be clutched thereto at certain times. It will be noted that twice in each revolution a dwell will occur in the operation of parts connected to the link 139 when this lies parallel to or at an angle with respect to its operating crank arm 150. This also occurs in connection with the parts operated from link 18 connected to crank arm 22.

This gear wheel 142 is in constant mesh with pinion 25 receiving drive from the main shaft of the machine. This crank arm 140 also has a link connection 143 to a rocking segment 144 pivoted at 145 to the frame 1, and having teeth 146, and notches 147 adapted to engage with projections 148 on the star wheel 149 on the bush 129. The bush 129 has a guide plate 150 upon it. This guide plate 150 in its vertical displacement engages with the side of a vertical guide plate 151 pivoted at 152 to the frame 1, and is thereby held rigidly until towards the end of the vertical lift of the link 132 by reason of the end of a link 153, pivoted to the bell crank lever 137, engaging against it, until a guide pin 154 at the end of this link sliding in a slot 155 in the frame 1 comes into an angular deviation 156 of this slot, allowing tilting of the guide 151, and thus free rotation of the guide plate 150 with the bush 129 in the completely raised position of a record. In addition to the teeth or projections 148 on the star wheel 149, a pair of projections 157 are provided diametrically opposite one another, which engage with the side of the plate 144, so that this, in rocking from the position shown in Figure 2 of the drawings, will first engage the side of a tooth or projection 157 and then the notches 147 engage the teeth 148 to rotate this start wheel about its centre and thus rotate the bush 129 through 180° for reversing the record side for side.

The completion of this rotation through 180°, is ensured by reason of the space between the teeth 146 and the left side edge of the plate 144 sliding over the shaped edge of teeth 148 and this is further ensured by the reason that the link 153 rising in the straight part of the slot 155 will bring the upper end of pivoted guide 151 against the side of the guide plate 150. The upper end of the pivoted guide 151 is guided in a forked guide 159 with a stop end 160 to ensure correct alignment of the bush 129, and plate 150, when this is in the lower position as shown in Figure 2; that is to say, when sliding below the pivot 152.

A lever 590 pivoted at 591 to the frame has a turned-over upper end adapted to engage over the extended rear end of arm 97 through the action of a spring 592 when the end of arm 97 is raised out of the path of the finger 85, lever 590 is held out of engagement with arm 97 whenever the record supporting arms 72, 73 are in their lowermost position by contact of its lower end with bush 129. Whenever bush 129 is raised, however, lever 590 is permitted to engage with arm 97 to hold it out of the path of finger 85 until the bush 129 has returned again to its lowermost position.

A record, such as 3 is raised from the turntable 412 for its subsequent storage in the magazine by means of lifter plates 161, (Figs. 3 and 4), and is prevented from accidental sideways displacement prior to its being taken up by the pin 30 on the carrier, by being held indexed by a pin 162 on the end of an arm 163 carried by a spindle 504 on a yoke 164 in two bearings respectively on a bracket 165 on the turn-table carrier 203, and on the frame 1 of the machine, which yoke 164 has rigid with it a plate 166 (Figs. 1 and 2) on the same spindle 504 connected to it by belt 505 passing through arcuate slot 506 and also connected to spring 167 normally holding the said yoke, so that the pin 162 on arm 163 rests lightly on the turntable pin 413.

The plate 166 is engaged by the right hand end of a lever 404 pivoted at 405 to the frame, which lever 404 has a pin-and-slot connection 170 with a link 171 pivoted to the crank plate 134, so that on oscillation of this about the pivot 135 it will be obvious that the arm 163 will be swung out of range of the record; that is to say, into a substantially vertical position as distinct from a substantially horizontal position to allow the record-holding arms 72, 73 to rise and to be rotated about the axis of the bush 129 without fouling this arm.

The crank arm 133 in its oscillation about pivot 135 from the position shown in Figure 2 to raise the bush 129 as just described, will engage with the cranked end 172 of a crank arm 173 pivoted at 174 to the frame and operating freely in a guide 175 on the frame. This crank arm 173 is connected by a link 176 with the lever 119 hereinbefore mentioned having a segmental piece 177 upon it serving to guide the pawl 115 clear of the catch 113 so that it will not engage therewith during rocking of the rocking plate 116, as already described whenever the link 176 is raised.

Record lifting

The record lifting plates 161 as shown in Figure 3, are mounted on spindles 178 guided in plate 203 and have, at their lower ends, brackets 179 guided on vertical spindles 180 mounted on the frame plate 203, which brackets 179 are engaged by forked arms 181 on a yoke 182 oscillating angularly in knife edge bearing 183 in a bracket 184, and knife edge bearing 185 in the frame 1 (see Fig. 2). This yoke 182 as shown in Figure 2, has a cranked end 186 on the opposite side of the frame 1 to the plate 203 connected by a link 187 to a segmental plate 188 rocking about a pivot 189 on the frame 1, and having a shaped surface 190 engaged by a cam nose 191 on a cam 192 keyed to, or integral with, the pinion 60.

It will be noticed that the co-operating contours of the cam 192 and the shaped face 190 are such as to cause a completely controlled movement of the segmental plate 188 varying in amplitude at varying angular positions of the cam 192.

Further, it will be noticed that the cranked end 186 of the yoke 182 has a pin and slot connection 193 with a connecting rod 194, drawn to the left by means of a spring 195, and having a pivotal connection 196 with pivoted lever 197, the upper end 198 of which will, when the crank arm 186 is drawn over to the left by cam 192, lie underneath a stop 199 on the pivoted plate 166, thus holding the arm 163 with its dependent pin locked in a position just clear of the top of the pin 30 on the carrier 4 during its record transferring movement from the magazine to the turn-table.

Tone arm

The tone arm 200 (Figs. 3, 7 and 8) of any suitable form or construction carrying either a sound box or an electric pick-up, is adapted to oscillate radially of the record on vertical spindle 201, and has a horizontal pivotal support 202 carried by a bracket mounted on said spindle which spindle is rotatable in suitable bearings in a frame plate 203. This tone arm of course, is progressed automatically radially on the record by reason of the engagement of the stylus with the record groove. It will however, also be subject to automatic controls for arresting its action at the termination of the playing of a record and for the removal of the tone arm completely clear of the record (and, if desired, non-automatic control for producing a radial displacement at will for the repeating of any part of a record). To enable the tone arm 200 to be moved towards or away from the turntable and for any record thereon to permit transfer of a record to or from the magazine or its side for side reversal, there is provided a tone arm carrier 204 which carries a bracket 205 (Fig. 8) slotted to receive the end of a pin 206 guided in a slot in the frame plate 203 and secured to a connecting rod 227 the opposite end of which is connected to a bell crank lever 208, (see Fig. 4) passing through a slot in the main frame 1 and connected by a pivoted link 209 (see Figs. 1, 2 and especially 6) to a plate 210 carried on a floating pivot 211 on a lever 212 pivoted at 213 to the main frame 1 and normally drawn by spring 214 against a stop 215 on the frame 1. The plate 210 has a cam surface 216 in the form of an arc of a circle about 211 as centre co-operating with a pivoted finger 217, the opposite side of which is engaged by a stop end 218 on a link 219 pivoted at 220 to the wrist plate 91. It will consequently be seen that on a return oscillation of the wrist plate 91 about its pivot 92 (i. e., in the clockwise direction), the link 219 will displace the plate 210 against the spring 214, and thereby draw the tone arm carrier 204 away from the edge of the record leaving behind it the tone arm which it has just carried into a position in which the stylus has been deposited upon and just within the edge of the record 3. On the other hand, an oscillation of the wrist plate 91 in the counter-clockwise direction will allow plate 210 to be displaced to the left by spring 214 until the tone arm carrier 204 is arrested by contact with a record on the turntable. Thereafter co-operation of plate 210 with link 219 through finger 217 is maintained by change in the angular disposition of plate 210 through lever 112 and spring 214 until stop 215 is reached.

Figure 9:
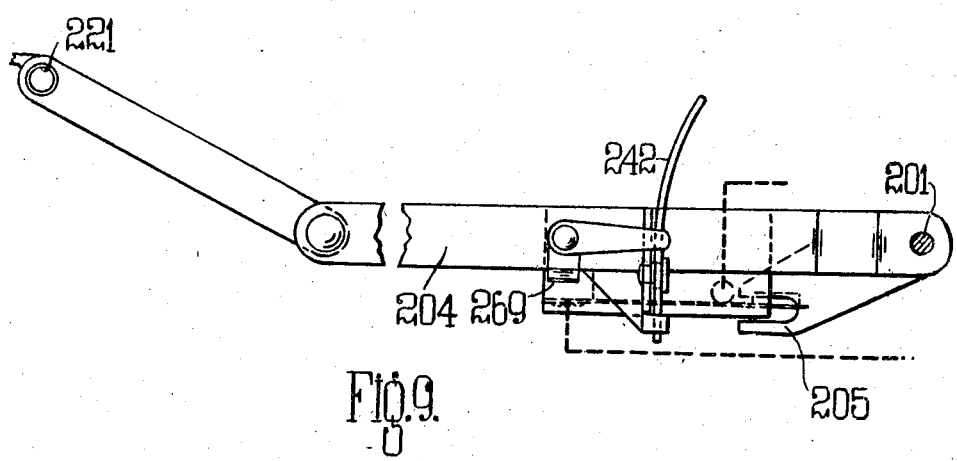
Figure 9 is a plan of the tone arm carrier with tone arm removed.

It will be preferred for this purpose that the tone arm carrier 204 has a stop pad or roller 221 (Figs. 4, 8 and 9) adapted to abut against the edge of the record. The provision of the floating pivot 211 (Figs. 2 and 6) and the cam surface 216 will obviously allow for this to be effected, as above described, irrespective of the diameter of the record (within wide limits) which may happen to be upon the turntable, in that the stop end 218 of the link 219 will engage upon and lock at varying points along the cam surface 216 according to the angular disposition of the plate 210. During the radial inwards displacement of the roller 221 until it engages the edge of a record, the interposed finger 217 prevents relative slipping between the cam surface 216 and link 219.

The tone arm carrier 204 will, during the inwards displacement of the tone arm 200, be raised so that its stylus point lies above the plane of the record, by means of a slide 222 (Fig. 7) sliding in pin-and-slot guides on the vertical bracket 223 carrying the horizontal pivot 202 for the tone arm, which slide abuts against the lower surface of the tone arm 200, and is engaged by one end of a pivoted lever 224 pivoted on the said bracket 223 the other end of this lever engaging a double flanged collar 225 which is also engaged by the cranked end 226 of a lever 227 pivoted at 228 (Fig. 4) to a right-angled bracket on the frame 203. The opposite end 229 (Figs. 1, 2 and especially 6) projects through the frame plate 1 and engages in a slot 230 of a link 231 pivoted at 232 to a bell crank lever 233 angularly displaceable about a pivot 234 on the frame 1, and tending to be forced down by spring 235, but displaceable against this spring by a link 236 from a lever 237 of the first order, pivoted at 238 to the frame, and carrying a roller 239 engaging with an edge cam 240 rigid with the crank arm 94 rotating with toothed wheel 69 about the axis 95.

It will consequently be seen that rotation of toothed wheel 69 (Fig. 6) through drive 24, 26, 27 on the main driving of the machine will cause displacement of the lever 237 about its pivot 238, thus displacing the bell crank lever 233 against spring 236 lifting a link 231 and drawing up the end 229 of the lever 227, and thus depressing the collar 225 (Figs. 7 and 8) to raise the tone arm about its horizontal pivot, and at further revolution of this toothed wheel 69 first raising the collar 225 again somewhat and thus allowing the lowering of this tone arm until the stylus engages upon a record, further upward displacement of this collar bringing the end of the lever 224 out of locking engagement with a notch 241 (Fig. 10) in a spring catch 242 mounted on the tone arm carrier 204, which held the tone arm 200 locked to the tone arm carrier 204 during its angular displacement about the spindle 201. If the lifter plates 161 are operated from wheel 60 in geared relationship with the crank 94 controlling the tone arm carrier, it will be seen that these plates 161 are displaced vertically in synchronism with the displacement of the tone arm carrier 204. The tone arm now lightly dropped with its stylus in contact with a record is ready for displacement by the rotation of this record freely and progressively inwards for the playing of a record, this motion being assisted or started by the spring finger 269 floating on the tone arm carrier 204 giving an initial radial thrust to the tone arm immediately on release of the catch 242. This interlocking of the tone arm carrier with the tone arm, and its subsequent automatic release in this manner will prevent any "pitching" or uncontrolled radial feed forward of the tone arm over the record, and possible damage of this, as would otherwise occur due to inertia of the tone arm, whenever the tone arm carrier was displaced inwards and suddenly arrested by contact of roller 221 with the edge of the record.

During the playing of the record the main shaft drive 28, 27, 26 . . . is interrupted with the pinion 69 in the position shown on Figure 2 of the drawings, but if the further progression radially inwards of the record of the tone arm over the record ceases for any reason, whether this be by operation of a master control stopping playing of the record at any point in its length, or by the tone arm coming to the end of the effective record groove, as will be hereinafter described, a contactor 243 (Fig. 2) is operated, which contactor may comprise an electromagnet 244, the pivoted armature 245 of which has a contact arm 246 upon it adapted to contact with contact 247 completing the circuit of an electro-motor (not shown) driving the shaft 28, and thus setting in rotation gears 142, 24, and 69, rotation of which latter, causing rotation of the crank arm 94, will swing wrist plate 91 about pivot 92, drawing link 219 to the left, and thus bringing the end 248 of a lever 249 pivotally connected to link 219 and pivoted at 250 to the frame 1 against the end 251 projecting through a slot 519 in the frame 1 of a lever 252 (see Figs. 4 and 6) pivoted to the plate 203, the crank end of which 254 bears against an arm 256 projected from the right-angled bracket 223 on the tone arm 200, and thus swings the tone arm radially outwards completely clear of the record. As the tone arm 200 passes over the tone arm carrier 204 the spring controlled catch 242 locks over the lever 224 pivoted to this plate.

A control is provided for the mechanism to predetermine the subsequent operation which may be the side for side reversing of the record which has been played, or the transfer of the record back to the magazine and the withdrawal of a fresh record from the magazine, or the replaying of the record which has been played. This control may predetermine a sequence of these operations.

The first two of those operations are effected respectively from gear wheel 142 and gear wheel 24 through clutch mechanisms on the spindles of these wheels selectively brought into operation by a manually operated control to be hereinafter described. Replaying of a record is determined by a setting of a disc 408 on the shaft 257, or alternatively by a remote control connected to the machine. The shaft 257 is carried in bearings in the main frame plate 203 and has a control disc 258 (Fig. 6) keyed rigidly to it.

Knob 408 has four positions of adjustment as shown in Fig. 3. In position 430 (the neutral position) the automatic mechanism is out of effective action (as shown in Fig. 6); in position 452 the automatic mechanism is set for loading and/or unloading the magazine (as shown in Fig. 2); in position 429 the automatic mechanism is set for repeated playing of one side of a record on the turntable; and in position 425 the automatic mechanism is set for a sequence of operations which may comprise (a) playing one side only of each of a sequence of records or (b) playing each side of each of a sequence of records or (c) playing one side and then the other repeatedly of a single record, choice of (a), (b) or (c) being determined by a further control on the machine operated locally or from a distance, such as the manual control lever 303 hereinafter described. (Fig. 6 shows a rear view of the control.)

The control disc 258 has a cam surface 259, which in the counterclockwise turning of the control shaft 257, (clockwise as viewed in Fig. 6) from the position shown in Fig. 6, will raise the pin 260 of a pivoted gravity catch lever 261, the nose 262 of which is lifted thereby clear of the end 251 of the lever 252, and thus leaving this lever controlling the tone arm carrier locked by a second gravity catch 263 and subject to being locked by a third gravity catch 432. The catch 263 is raised when lever 249 contacts with inclined projection 507. Resting upon the top of the gravity catch lever 261 is the end 264 of a pivoted lever 266 (see Fig. 2) pivoted at 265 to the frame, and carrying at the end remote from the cam plate 258 a spring contact 267 adapted to engage a fixed contact 268 forming a series switch in a circuit through the electromagnet 344.

This rotation of the disc 258 slightly from the position shown in Figure 6 to that described above is accomplished by setting the knob 408 in the position 425 (Fig. 3) and will allow a pin 270 on a rocker plate 271 pivoted at 250 to the frame to fall by gravity into a notch 272 in the cam plate 258, which allows a freely pivoted finger 273 on this plate 271 to fall down into such a position that the armature 126 (Fig. 2) is no longer held rigidly up, but has a certain degree of freedom due to its interengagement with the notch 274. On the first rotation therefore, of the shaft 95 carrying the crank arm 94, the wrist plate 91 (see Fig. 2) will have been turned about its pivot 92 to turn the plate 116 about the pivot 112 until the projection 125 on this plate 116 strikes the arm 275 on the plate 123 tilting this about its pivot, whereupon the end 121 of the lever 119 can drop into the open notch 122 and the locking notch 128 on this plate is drawn clear of any locking engagement with the armature 126, this armature falling against the stop 508 so that its end is adjacent to the edge 509 on the pivot plate 123 thus holding this pivot plate in this position of adjustment irrespective of the swinging back of the plate 116.

In view of the fact that the plate 123 is held in this position, pawl 115 is now no longer held out of range of the notch 113, but can engage with it, so that when the plate 116 is turned by means of its connection by link 117 with wrist plate 91, upon the next revolution of crank 94 the plate 111 will be given an angular displacement about the pivot 112, drawing down link 110 and swinging the bell crank lever 109 about its pivot. Depending on the setting of knob 408 controlling the position of the yoke 104 (Figs. 11 and 12), either catch 106 on the pivoted lever 102 is in engagement with notch 108 on this bell crank lever 109, or a second catch 276 of a similar pivoted lever 277 is in engagement with notch 278 in this bell crank lever. Now, if catch 276 is in engagement with notch 278 in this bell crank lever, the pivoted lever 277 will be drawn to the right, swinging a plate 279 about pivot 280 on the frame to bring a projection 281 through an opening 282 in a flanged masking plate 283 (see also Fig. 13) carried on a bracket 284 on the frame 1, so that on the rotation of the gear wheel 24 a pivoted pawl 285 on this gear wheel normally riding on the flanged periphery 286 of the masking plate 283 will be guided by the cam surface 287 on the rock plate 279 to be swung by this cam surface 287 to bring its nose 288 into engagement with a notch 289 in an arm 290 integral with or keyed to pinion 23 carrying the crank arm 22, so that this crank arm 22 is then driven positively from the gear wheel 24 normally for only one revolution of the crank arm 22, as long as the nose 288 is running round the internal periphery of the flange 286 on the masking plate 283. While of course, the projections 276 on the pivoted lever 277 has been in engagement with the notch 278, the corresponding projection 106 on the pivoted lever 102 has been accommodated within a locking groove 107 in the frame of the machine.

Now similarly, if the yoke 104 has been tilted to raise the projection 276 into a locking groove 291 in the frame, then the projection 106 on the lever 102 will have dropped in the operating notch 108, so that angular displacement of the bell crank lever 109 will bring a projection 292 on a rocking plate 99 into a cut-away part 293 of a second flanged masking plate 294 carried by the bracket 284, so that a projection 295 on the end of a pivoted pawl 296 on the gear wheel 142 can, in its rotation, no longer continue to ride round the outside flanged periphery of the masking plate 294, but will be forced into a notch 297 in an arm 298 keyed to or integral with the crank arm 140 by a cam surface 299 on this rocker plate 99, and then continue to run on the inside periphery of the flanged masking plate 294 in a manner similar to that described in connection with the engagement of projection 288 on pawl 285 with the arm 290 keyed to or integral with the crank arm 22.

It will be seen that the pawl 285 is engaged with the notch 282 to render the clutch effective, by the plate 279 being turned about its pivot 280 to cause projection 281 to engage the end 288 of pawl 285 by the link 277 being drawn to the right by the turning of the bell crank lever 109; and of course the same for the clutch 296, 297. Now as this bell crank lever 109 is connected by link 116, plate 111, link 117, wrist-plate 97 and link 93 to the crank 94, it follows that at each revolution of the crank 94, with the parts in the position of Figure 11 by way of example, the link 277 will first be pulled to the right to cause engagement of the clutch and then pushed to the left so that by this means the clutch is disengaged after one revolution of the part 290, as when the link 277 is pushed to the left, the projection 300 comes into the path of the end 292 of the pawl 285; and of course similarly for clutch members 296, 297.

When the lever 119 is drawn down the gravity catch 432 pivoted at 510 to the frame 1 and engaged by pin 511 on lever 119 is allowed to fall into locking engagement with end 251 of lever 252 (Fig. 6).

When the projection 276 on the end of the lever 277 is drawn into the locking groove 291 in the frame, the lever 277 is no longer drawn to the right by tilting of bell crank 109 and accordingly a second projection 308 on the pivoted plate 279 remains within range of the tail end 292 of the pivoted pawl 285, and tilts it positively out of engagement with the driving notch 289. The same of course, applies to the pawl 296 operated by a similar projection on the pivoted plate 9.

It will be noted that both on the engagement of the pawl 288 with driving notch 289 and pawl with notch 297, and on the disengagement of these pawls and driving notches respectively, no driving load or thrust is being transmitted through them.

It will be preferred to provide a lightly loaded spring catch, such as 301, to hold the bell crank lever 109 in the raised position.

The yoke 104 is not pivoted directly to the frame, but is carried by a pivot 105 on a control lever 303 (see Fig. 16) pivoted at 304 to the frame, which lever 303 has a cranked end 305 passing through a slot 512 in the frame 1 to permit manual adjustment of this lever 303 from the front of the machine. The yoke 104 is a T-shape, as above indicated, having two slotted arms; the third downwardly depended non-slotted arm 306 has a pivotal connection through a link 513 to a bell crank lever pivoted at 308 to the frame, and having two arms 309 and 310, the outer end of one arm 309 of which is engaged by a stop 311 on the pinion 60, whilst the other arm 310 is adapted to be engaged by a stop 312 on the crank arm 140, so that for each revolution of wheel 60, or crank arm 140, the yoke 104 is tilted away from the wheel carrying the stop which tilts it.

It will be appreciated that by reason of the two to one gear connection of the gear wheel 60, 23, the bell crank lever 109 will be twice rocked about its pivot, so that the pawl 288 is in driving operation with a notch 289 for two revolutions of the gear wheel 24.

It will consequently be seen that by tilting the lever 303 by hand by means of knob 408, the yoke 104 can be displaced about its pivot, riding on stop 514 or 515 and carrying arms 309 and 310 out of the tracks of stops 311 and 312.

The displacement of the link 58 in space by reason of its rotation through the pinion 23, brings its left side against the crank end 313 of an arm 314, rigid with the pivoted lever 173, so that this lever is tilted about its pivot 174 to lift the link 176, thus lifting the pawl 115 so that it cannot engage with the catch 113.

Cam disc 258 on the hand control spindle (Fig. 6) has an additional projection 315, and can be turned by moving the knob 408 into the position 429 (Fig. 3) so that the pin 260 is lifted by this projection and rests upon it, in which position of the parts the catch plate 261 is completely raised whilst the pin 270 lies against the portion 316 of this cam plate, thus raising the link 273 and lifting armature 126 (Fig. 2) into the raised position, so that in this position the pivoted plate 123 can fall, so that the end 121 of the lever 119 comes to rest upon the end 124 of this plate 123, holding the driving pawl 115 out of engagement with the notch 113. Should the cam disc 258 then be turned slightly back by setting knob 408 in its neutral position 430 the pivoted catch plate 261 cannot drop back, as its end 317 is then held by a projection 318 on a pivoted plate 319 controlled by spring 320, the position of which plate 319 is controlled by the position of the bell crank lever 208 controlled by spring 214, and connected to the tone arm carrier 204. Displacement of the end of this bell crank lever 208 towards the end of this slot in the frame 1 allows the projection 260 on the catch 261 to drop into the notch in the cam disc 258, lying between the projections 259 and 315, the dropping of which catch opens the contacts 267, 268. This circuit however, has been closed by a parallel disposed switch consisting of a fixed contact 318 co-operating with a moving contact 319 on the end of a lever 320 pivoted at 321 to the frame and provided with spring 516, the upper end 322 of which lies within range of the end 251 of the lever 252 operating the displacement of the bracket 256 connected to the tone arm.

The cam disc 258 (Fig. 2) has pivoted to it a link 323 connected to a wrist plate 324 pivoted at 325 to the frame, which has pivotal connection to a link 326 pivoted to the arm 327 of a three-arm lever pivoted at 328 to the frame, the arm 329 of which has a pin-and-slot connection 330 with the end of a lever 331 controlled by spring 332 and pivoted to a catch lever 333 pivoted at 334 to an extension 335 of the lever 66 moved about its pivot by the edge cam 68. The catch end 336 of the catch lever 333 is adapted to engage over a pin (not shown) on the back of the pivoted plate 188, thus coupling this plate 188 to the pivoted lever 66 for operation by the cam 68.

The other arm 338 of the lever 327, 329, is pivoted through a link 339 by pin-and-slot connection 340 to an insulated lever 341 pivoted at 517 to the frame 1 carrying an insulated contact 342 in a circuit of the electromagnet 244, and co-operating with a fixed contact 343, and a spring contact 344; the lost motion in the pin-and-slot connection 340 is taken up by spring 345.

This arm 338 has also a pivotal connection to a toggle link 346, 347, the floating pivot 348 of which is adapted to be engaged by the side of a lever 349 pivoted at 350 to the frame 1. The lever 347 of the toggle is pivoted at 351 to a bell crank lever 352 pivoted at 353 to the frame, and connected by a pivot at 354 to a link 355 pivoted at 356 to a lever 357 pivoted to the frame at 358, and normally drawn by spring 359 against a stop 360 on the frame, whilst its opposite end has a notch 361 adapted to co-operate with a stop 362 adjustably mounted on the front of the cam disc 240 and stop 362 also co-operates with a notch 363 in the upper end of the lever 349, the lower end of which lever has a notch 364 adapted to hold the armature 245 in the raised position under certain circumstances.

The lower end of this lever 349 has an insulating contact 365 engaging with a contact 366 carried on an insulated plate 367 mounted on a link 368 forming a switch in the circuit of the electromagnet 127. One end of the link 368 has a pivotal connection 369 to a lever 370 pivoted at 371 to the insulated plate of the contactor 243, whilst its upper end 372 is adapted to also hold the armature 245 in the raised position under certain circumstances.

This link 368 is slotted at 373 to be guided by a pin 374 on the frame, and has a crank end 375 engaging in front of a nose 376 on the lower end of the link 110.

It will consequently be seen that when link 110 is lowered by reason of its connection with the pivoted plate 111, the link 368 will be drawn to the right, as shown in Figure 2, bringing the end 372 of lever 370 under the armature 245 of electromagnet 244 to hold this in the raised position, this link 368 then being locked in this position against the action of return spring 377 by a gravity catch 378 pivoted at 379 to the frame engaging in a notch 518 and is thus held locked until this catch 378 is again raised by reason of the rotation of the wrist plate 91 about the pivot 92 bringing the side of the link 117 against the cranked end 380 of an arm 381 on this pivoted catch.

A link 382 is pivoted at 383 to the link 326, and is connected at its opposite end by a pivot to the outer end of the stop lever 70.

OPERATION OF THE MACHINE

*Magazine loading*

Imagining that the motor circuit is open, and the magazine is devoid of records, the first operation will be the turning of main control knob 408 to the position shown by arrow 452 (Fig. 3) where it is held automatically against accidental displacement by engagement for instance of a spring pawl 409 in one or other or a number of grooves 410 in locking plate 411, which may carry indicia indicating the various control positions of operation of the machine. This turning of the knob places plate 258 in the position shown in Figure 2 and thus causes raising of finger 163 wholly clear of the gramophone turn table 412.

Figure 14:
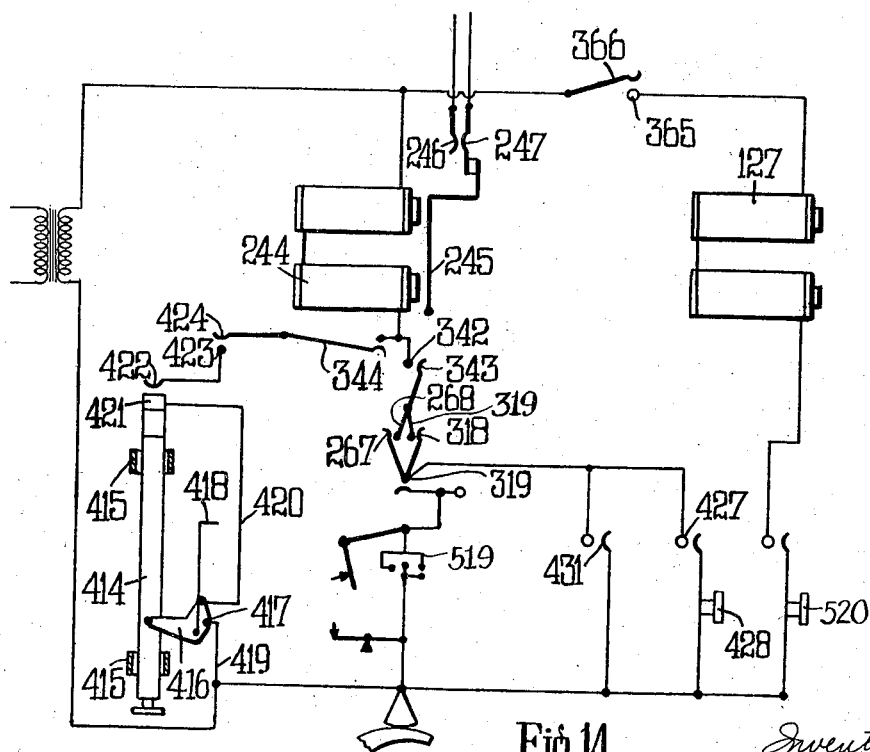
Figure 14 is a wiring diagram of the electrical parts of the apparatus.

A record such as 3, is then laid upon the usual centre indexing pin 413 of the turn table 412. A switch arm 414 (Fig. 14) is then displaced in guides 415, causing the rocking of a plate 416 about a pivot 417 on the frame, which plate carries a gravity finger 418, which, then, completes circuit from main conductor 419 through a connection 420 on to an insulated extension 421 on the switch arm 414. This arm 414 also makes contact between 431 and the fixed contact 422 connected to conductor 423 (see Fig. 2) leading to the limit switch contact 424 disposed conveniently on the main frame 1 of the machine adjacent to the magazine 2. In the lowermost position of this magazine, the stop 424a on this magazine opens this switch 424 (see Fig. 5). The switch, however, will be closed whenever the magazine is in its lowest position and when the arm is pushed in the circuit being completed through contact 344, contact 342, (see also Fig. 2), to electromagnet 244, which then raises its armature 425, closing contacts 246, 247, of the motor circuit, which contacts immediately become locked by engagement of armature 245 in notch 364, thereby starting the motor in rotation, and together with it rotation of the main shaft 28.

This rotation of the main shaft 28 causes rotation of pinion 69, which, by reason of crank arm connection 94, link 93, wrist plate 91, connecting rod 385, lever 387, cranked end 395 of the lever 392, segmental arm 15, connecting link 14, crank arm 13, sleeve 11, crank arm 10, and connecting link 9, will cause displacement of the carrier 4 in its runways 6 and 7 substantially half-way of its total travel.

The circuit of the motor connected to driving shaft 28 is now arrested by the opening of the motor circuit, when the crank arm 94 has proceeded substantially through 90° of travel from the position shown in Figure 2. Towards the completion of this 90° of movement, the projection 362 has engaged the notched end 361 of lever 357, and thus causes the floating pivot 348 of the toggle 347, 346, to engage the side of the pivoted lever 349, turning it anticlockwise about pivot 350, and thus withdrawing locking notch 364 from out of range of the armature 245, whereby this can drop, opening motor circuit at contacts 246, 247. The carrier 4 being thus arrested half-way across its total travel would be in a convenient position for the removal of any record which may be upon it, as will be hereinafter described. The magazine however, is, at the present moment, regarded as being empty. Consequently, further rotation of the shaft 28 will be essential, which will require the recompletion of the motor circuit. This is effected by a second depression of the switch arm 414, closing the motor circuit contacts 246, 247, in precisely the same way as above described, these contacts then immediately again becoming locked by the notch 364, as the inertia of the parts on the previous swinging of lever 349 has cleared stop 362 of its engagement with notched end 361 of the lever 357.

The crank arm 94 is now able to complete the remaining 270° of its cycle, the motor being finally stopped at the completion of the cycle by the stop 362 having engaged with the notched end 363 of lever 349, so withdrawing notch 364 from engagement with armature 245. The carrier 4 will now therefore, have been traversed to the end of its total range; that is to say, to the end of the guides 6, 7, and will lie over the gramophone turntable.

When the face cam 68 keyed to pinion 69 has roughly been turned through 210° of arc from the position of the parts shown in Figure 2, it will have raised the record lifter plates 161 with any record which may be placed upon the table for storage in the magazine, to lift the record clear of the table and index this upon the lower pin 31 of the carrier 4, this displacement of the lifter plates being effected through lever 66, extension 335 of this, catch lever 333, segmental plate 188, connecting rod 187, cranked arm 186, yoke 183 and spindles 178 (Fig. 3), the lost motion in the rod 335 allowing for a dwell to enable this operation to be completed. The carrier 4 now starts moving back carrying with it the record 3. The magazine will, towards 270° of arc from the position of the parts shown in Figure 2, be supported by engagement of pawl 62 with ratchet 44 with the pawl 61 held clear by stop 70 as above described, and further rotation of the wheel 69 will allow the magazine to drop substantially half of its total step drop per record, i. e., to the position shown in Fig. 2. After the gear wheel 69 has completed substantially 330° of arc, the carrier 4 will have reached its initial position that is to say, in its limit remote position from the turn-table 412, when the record will lie with its central perforation co-axial with the spindle 52.

During these movements, the pawl 46 is held out of engagement with ratchet wheel 43 by rocking lever 54 since pinion 60 does not rotate during the magazine loading.

The complete stripping of the record from the pin 31 by reason of the lowering of the magazine 2, will only be completed during the initial phase of the next cycle of operations. Further successive dual sequence depressions of the switch arm 414 will allow further records to be stored in sequence in the magazine, as above described, until the magazine is completely full, when the magazine will have reached its lowermost position, and will open the contactor control circuit at switch 424. After the records have in this manner been fed in sequence to the turn-table, and automatically stored in the magazine, they can, at the will of the operator, be returned in sequence from the magazine for the purpose of playing upon the turn-table.

*Sequence of playing of records*

The control knob 408 (Fig. 3) is turned counter-clockwise into the position indicated by index 425. This turning of the knob rotates plate 258 until the pin 260 rests on the part 259 (Fig. 6). The wrist plate 324 is thereby turned in a counter-clockwise direction from the position shown in Figure 2, so that catch 296 is raised from notch 395 in segmental member 15 and so that contacts 342, 343 are closed. Stop 70 is also swung clear of pawl 61 allowing this to hold the weight of the magazine through ratchet wheel 43, owing to the tilting of insulating lever 341 by reason of its connections through three-armed lever 327, and link 326 to wrist plate 324. At the same time plate 271 is no longer held up and therefore allows dependent arm 273 to fall leaving armature 126 held solely by plate 123. Similarly, lever 399 is no longer held up and therefore end 406 of lever 404 is dropped from beneath pivoted lever 166. Catch 261 is raised from engagement with end 251 of lever 252 and by raising lever 266 maintains contacts 267, 268 closed. A push button switch 428 (Fig. 14) operated directly or remotely, completes contacts 427, completing circuit through contacts 267, 268, 343, 342, to the electromagnet 244, which again completes the motor circuit at contacts 246, 247.

The shaft 28 is then again in rotation. Crank arm 94 then again commences to rotate clockwise as shown in Figure 2, spacing wrist plate 91 about its pivot 92, swinging pivoted plate 116 about a pivot 112 by reason of link connection 117, until the pivoted plate 123 is engaged by it, and tilted until it reaches its raised position where it is held by the falling of the armature 126 simultaneously therewith. The link connection 219 to the wrist plate swings the pivoted lever 249 about its pivot 250 first releasing plate 210 which swings in under the action of spring 214 and then raising catch 263 out of engagement with the end 251 of tone arm lever 252. Upon release of the tone arm lever 252, spring 214 (Fig. 4) can draw the tone arm carrier holding the tone arm towards the turntable, rotating plate 210 about pivot 211. On the return therefore, of the link 219, the tone arm is free to move in gradually radially of the turntable. If there is a record 3 upon the turntable the tone arm moves inwards until the pad or roller 221 abuts softly against the edge of this record.

During this time, the tone arm has been first raised and then moved gradually down about its horizontal pivot 202 by reason of the gradual release of the flanged collar 225, as the roller 239 comes around the eccentric contour 428 of the edge cam 240. As the roller 239 then comes into the cut-away portion of this edge cam, the lever 224 is withdrawn from the catch 242, thus allowing the tone arm proper 200 to be pushed over on to the record by the spring 269, so that playing will commence. When the end 218 of link 219 towards the end of its return movement contacts with face 216 of plate 210 (through friction plate 217), the tone arm carrier is moved away again from the turntable. On completion of the return movement of link 219 the wheel 68 has completed one revolution so that stop 362 tilts lever 349 allowing armature 245 to drop and open the motor circuit so that playing proceeds until such time as the stylus reaches the end of the effective playing groove on the record. Any automatic means may be provided for closing main motor circuit again on completion of playing through the contactor 243, but this is preferably an arrangement, such as is set forth in my Letters Patent No. 2,116,056, granted May 3, 1938, and which is effective through an arrangement of contacts 519, either when the stylus comes into a run-off groove provided in the centre of a record or at any time when the inward radial progression of the tone arm has ceased to close the circuit of electromagnet 244 through contacts 318, 319, 267, 268, 343, 342.

At any time during playing of a record the circuit may be closed at the will of the operator by means of press button 426 through contact 427.

This closing of the motor circuit either through closing of contacts 519 or of contact 427 sets shaft 28 again in rotation. The first half revolution of the face cam 240 lifts the stylus off the record reversely to the movement of its dropping on the record, as above described and the tone arm is then swung clear of the turntable by contact of pivoted lever 249 with the end 251 of tone arm lever 252. At the same time the turning of the wrist plate 91, in view of the fact that the cranked end 121 of lever 119 has dropped into notch 122 and that therefore the pawl 115 can now engage with projection 113 on lever 111 to draw down the link 110, causes one or other of the clutches 288, 289, or 295, 297, to become operative, whichever clutch being in operation being determined by the position of the yoke 104 which may be set by the hand-lever or like operating element connected to the cranked end 305 of the pivoted lever 303. Dropping of link 110 allows catch 432 to fall detaining tone arm lever 252 until the next forward movement of pivoted lever 249 allows tone arm lever 252 to be detained by catch 263. At the same time dropping of link 110 draws rod 368 to the right allowing it to be detained by catch 361 so that the pivoted arm 370 holds armature 245 open during its temporary release from notch 364 when lever 349 is hit by catch 362 on completion of one revolution of wheel 68. The shaft 28 will therefore continue in further rotation.

Suppose the yoke 104 is set to allow effective operation of clutch 295, 297, (i. e., for side for side reversal of the record), then the further rotation of main shaft 28, causing rotation of gear wheel 142 will cause rotation of crank arm 140, which, through link 139, pivoted lever 137, link 136, wrist plate 134, lever 133 and link 132 causes raising of the arms 72, 73, which have been brought into engagement with the edge of the record at four points, through release of catch 97 by tilting of plate 99 as above described, the continued rotation of the gear wheel 142 causes the side-for-side reversal of the record, the lowering of the record in its reversed position back on to the turntable, and the release of the record by the arms 72, 73 again moving outwards, all as above described. During the second revolution of wheel 68 lever 173 is raised by lever 133 and accordingly lever 119 is raised by link 176 so that pawl 115 no longer engages with catch 113. In consequence rod 368 is not drawn to the right and rotation of wrist plate 91 disengages catch 361 allowing the armature 245 to fall upon completion of this second revolution of wheel 68 opening the motor circuit. During the second half of this second revolution the tone arm carrier 204 can swing back into contact with the record as before, and allow the automatic dropping on of the stylus, and playing of this reverse side of the record.

During playing the pivoted plate 123 is held as before in the raised position by the end 128 of the armature 126 bearing against the edge 509.

The wrist plate 91 has a perforated swivelling stud 384 upon it forming a pivotal connection with lost motion to a rod 385 connected at its outer end by pivot 386 at the end of an arm 387 moving freely about a pivot 138 on the frame, springs 388 and 389 on opposite sides of the stud 384 taking up said lost motion as, and when, required. A stop 390 on the frame limits movement of the lever 387 in one direction. Carried on a pivot 391 on the lever 387 is a rock lever 392, one end of which has a stud 393 in engagement with the notch 394 in the wrist plate 324, the other end of this lever 392 engages with a notch 396 in the segmental arm 15, thus coupling this arm at certain times with the wrist plate 91. An arcuate guide finger 397 mounted on the frame 1 serves to maintain the crank 395 in engagement with the notch 396, when so disposed, or equally to maintain it out of range of this slot 396 when disengaged, and when oscillated about the pivot 138 by reason of its rod connection 385 with the wrist plate 91. The pivot 398 connecting link 323 with the cam disc 258 is extended to the rear of this plate, and is adapted to abut against the outer end of a lever 399 pivoted at 400 to the frame, the opposite end of which lever is pivoted at 401 to the link 402, pivoted at 403 to one end of a pivoted lever 404 pivoted at 405 to the frame, and which has a pin-and-slot connection 170 with the link 171, and also has a cranked end 406 adapted to engage the parts in contact. The extension of pivot 398 is also adapted to abut against the nose of plate 271 to hold this in the raised position.

If the manual control lever 303 is in the middle position the rotation of the stop 312 on the crank arm 140 will have brought it into contact with the arm 310, and therefront thrown this arm in a clockwise direction about its pivot 308, thus causing displacement of end 106 of arm 102 from notch 108 into notch 107 (Fig. 11) and displacement of end 276 of arm 277 from notch 291 to notch 278 thus preventing clutch 295, 297 from next coming into operation and permitting clutch 288, 289 next to come into operation. If, however, the manual control lever 303 is in the right-hand position as viewed from the back of the machine, arm 310 is held out of the path of stop 312 and end 106 of arm 102 will remain in notch 108.

In the event that end 276 of arm 277 is engaged in notch 278, on the completion of the playing of the reverse side of the record, the record transferring mechanism will operate to transfer the record from the turntable into the magazine and to transfer another record from the magazine to the turntable.

Upon conclusion of the playing of the record or optionally at any time, as hereinbefore described, the motor circuit is closed setting the shaft 28 again in rotation. As before, the first half revolution of cam 240 lifts the stylus off the record and the pivoted lever 249 swings the tone arm clear of the record locking it into the tone arm carrier. Turning of the wrist plate 91 on this occasion causes the clutch 288, 289 to become operative whereby pinion 60 is rotated. During the first part of the revolution of pinion 60, crank 22 on pinion 23 is moving over its dead centre, movement of link 18 being accommodated by spring 20; on further revolution of pinion 23, the carrier 4 is moved by crank 13 through link 14 from a position in the magazine to a position over the turntable. At the same time rotation of pinion 60 has caused the face 191 of cam 192 to engage with the upper edge 190 of pivoted plate 188 thus raising the lifter plates 161 which in turn raise the record from the turntable and hold it above the turntable and above the path of travel of the carrier 4. The record on the lifter plates raises the arm 163 clear of the carrier 4. When the carrier 4 reaches a position over the turntable and beneath the record on the lifter plates 161 it dwells there, motion of crank 22 across its lower dead centre being taken up by spring 19. During this period of dwell the lifter plates 161 are lowered through the further rotation of cam 192 and deposit the record on upper pin 30 of carrier 4. Further rotation of pinion 23 causes the carrier 4 to move back into the magazine while at the same time the lifter plates 161 gradually drop until they are in a position still above the turntable but below the path of the carrier 4. Arm 163 is held above the track of the carrier 4 by engagement of end 198 of lever 197 with the underside of lever 166.

By this time pinion 123 has made one complete revolution and pinion 60 has made half a revolution. Accordingly plate 54 has now been swung clear of ratchet 55 through links 56, 57 and 58. Therefore further rotation of crank 22 across its upper dead centre will raise the magazine through pawl 55 and links 48, 49, 50 lifting the record from the upper pin 30 carrier 4 on to the upper spindle 53 and raising a record from the lower spindle 52 on to the lower pin 31 of the carrier, this taking place during the period of dwell of carrier 4 in the magazine. Continuation of the second revolution of pinion 23 causes the carrier 4 with a record on its lower pin 31 to be moved again into a position over the turntable. During this movement of the carrier the record first slides on the arms 32, 33 on which it was resting in the magazine and thence slides on to the lifter plates 161 which are now still above the turntable but below the track of the carrier. During the period of dwell of the carrier over the turntable the lifter plates are dropped to release the record from the carrier and as the carrier travels back again into the magazine on completion of the second revolution of pinion 23, pinion 60 completes one revolution and cam 192 wholly disengages from plate 188 allowing lifter plates 161 to drop to their rest position below the turntable and arm 163 to fall so that the record is lowered gently on to the turntable.

Upon completion of one revolution of pinion 60, clutch 288, 289 is disengaged.

During the last half revolution of pinion 60, lever 173 is raised by contact of pin 59 with arm 314. This raises pawl 115 clear of catch 113. Plate 111 is thus rocked for each of the first two revolutions of wheel 68 but is not rocked during the third revolution which is half completed when pinion 60 comes to rest. Therefore the lower end 376 of link 110 draws the rod 368 to the right for two revolutions of wheel 68 but does not do so for the third revolution. Accordingly the motor circuit is broken on contact of catch 362 with end 363 of lever 349 on the conclusion of this third revolution.

Moreover, failure of plate 111 to be rocked permits link 110 to hold arm 432 out of engagement with the end 251 of tone arm carrier lever 252. During the third revolution of wheel 68, therefore, the tone arm moves inwardly towards the record and is deposited thereon for playing as before.

The displacement of the link 110 will also by reason of the pin 511 on it allow the lever 432 pivoted at 510 to the frame to drop, thus engaging by means of its hooked end (Fig. 6) over the end 263 of the lever operating the tone arm carrier 204. This tone arm carrier with the tone arm is thus locked in its position radially away from the record whenever the side for side reversal of the record is being effected by clutch 288, 290.

It will be seen that by closing the circuit through electromagnet 127 by press button 520 at any time when a record is being played and contacts 365, 366 are accordingly closed, armature 126 is raised and held temporarily by notch 128 in plate 123. On completion of the playing of the record, therefore, the tone arm will be removed and then returned to repeat the playing of the same side of the record.

By turning the control knob 408 into the position 429, the mechanism is set for continuously repeating the playing of one side of one record; that is to say, that the tone arm is continuously replaced on the record without either the inversion of the record side for side, or the mechanism being effective for operation of the magazine or the operation of the traversing carrier. In this position of the control knob 408 pin 260 rides on projection 315 of plate 258 and therefore armature 126 is held raised. Pawl 115 cannot therefore engage catch 113. The circuit of electromagnet 244 is closed through contacts 267, 268, 342, 344.

If the control knob 408 is turned from this repeat position into the neutral position 430, the catch arm 261 is left raised, being held by the end 318 of the spring control support 319, thus maintaining the motor circuit closed through arm 265 and contacts 267, 268. Although therefore, the first motion of the tone arm will open the circuit 267, 268, the motor circuit will nevertheless remain closed, and in operation, by reason of the closure of the parallel switch contacts 318, 319. Should there be a record on the turntable this will be played and then the tone arm and tone arm carrier moved to a position clear of the turntable.

Should there be no record 3 upon the turntable 412 with which the roller 221 can contact upon any inward movement of the tone arm carrier the inward movement will continue until the roller or a separate finger on the carrier 204 causes completion of contacts 431, causing closing of the motor circuit, which will thus immediately return the tone arm carrier to a position clear of the record.

In either case the motor will be stopped through opening of contacts 318, 319 when the tone arm carrier is locked in the position completely clear of the turntable through contact of bell crank 251 with the end 322 of lever 320. The machine can now carry out any desired sequence of operations for which it may next be set by control knob 408 and manual control lever 303. If this next operation happens to be a side for side reversal of the record, this mechanism will pass through its sequence of operations, and the tone arm 204 will again, as the final operation of such sequence, move in towards the turntable, causing a second closure of this switch 431 if there is no record on the turntable, whereupon of course the next essential operation will take place, e. g., the passage out from the magazine of the carrier with a fresh record for deposition in proper playing position.

Figure 15:
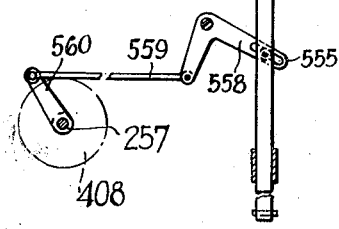
Figure 15 is a detail of the magazine step by step controller.

In order to stop the machine automatically when any desired number of records have been played, the peg 557 is inserted in an appropriate hole in rod 551 (see Fig. 15). Then as the records are played and returned to the magazine, the upward movement of the magazine causes the projection 550 carried thereby to come into contact with the peg 557. Further upward movement of the magazine then raises the rod 551 turning the bell-crank lever 558 connected thereto by a pin and slot connection 555 in a counter-clockwise direction. Through connecting rod 559 and lever 560 the control knob 408 is moved from the position 425 (automatic playing) to the position 430 (neutral). The gramophone may then be used for playing records placed on the turntable by hand or the magazine refilled automatically and lowered to bring projection out of contact with peg 557. The rod 551 moves in guides 552 and 553 and is provided with a stop 554.

I declare that what I claim is:

1. An automatic gramophone record playing machine including in combination a record magazine, a record turntable, a carrier for transferring records to and fro between said turntable and said magazine, a tone-arm cooperating with a record on the turntable, means for displacing said magazine relative to said carrier for the positioning of individual records in said magazine relative to the arm, means for displacing said carrier to and fro in a plane parallel to the record turntable to transfer records from the magazine to the turntable, operating means for displacing the tone-arm radially of the record, a main driving shaft, a rotary crank driven from said shaft, a pair of countershafts in constant driving connection with said main shaft, cranks on each of said countershafts, clutch means between said cranks and said countershafts, means for effecting operation of only one of said clutch means at a time, and linkage connected to said three cranks disposed in a plane parallel to said cranks and at right angles to the plane of the turntable for coupling said cranks to the magazine displacing means to the carrier displacing means, and to the tone-arm displacing means respectively.

2. An automatic gramophone record playing machine including in combination a record magazine, a record turntable, a carrier for transferring records to and fro between said turntable and said magazine, a tone-arm cooperating with a record on the turntable, means for displacing said magazine relatively to said carrier for the positioning of individual records in said magazine relative to the arm, means for displacing said carrier to and fro in a plane parallel to the record turntable to transfer records from the magazine to the turntable, operating means for displacing the tone-arm radially of the record, a main driving shaft, a rotary crank driven from said shaft, a pair of countershafts in constant driving connection with said main shaft, cranks on each of said countershafts, clutch means between said cranks and said countershafts, means for effecting operation of only one of said clutch means at a time, linkage connected to said three cranks disposed in a plane parallel to said cranks and at right angles to the plane of the turntable for coupling said cranks to the magazine displacing means to the carrier displacing means, and to the tone-arm displacing means respectively, a telescopic joint in one of said linkages, and springs taking up lost motion in said telescopic joint to allow dwell of one linkage whilst another is moving.

3. An automatic gramophone record playing machine including a turntable for supporting a record to be played, a tone-arm, a magazine for holding records, a carrier for displacing records between said turntable and said magazine, a main driving shaft, three countershafts in geared relationship thereto, a crank on one of said shafts continuously rotating therewith, means for displacing the tone-arm radially of the record and independently of its playing operation, links connecting said crank with such means, a further pair of cranks, clutch means coupling one of said cranks at a time to one of the other two countershafts, means for reversing the record on said turntable side for side with respect to the turntable and without interference from said tone-arm, links coupling one of said cranks to said side for side reversal means, and links connecting the other crank to the record carrier.

4. An automatic gramophone record playing machine including a turntable for supporting a record to be played, a tone-arm, a magazine for holding records, a carrier for displacing records between said turntable and said magazine, a main driving shaft, three countershafts in geared relationship thereto, a crank on one of said shafts continuously rotating therewith, means for displacing the tone-arm radially of the record and independently of its playing operation, links connecting said crank with such means, a further pair of cranks, clutch means coupling one of said cranks at a time to one of the other two countershafts, means for reversing the record on said turntable side for side with respect to the turntable and without interference from said tone-arm, links coupling one of said cranks to said side for side reversal means and links connecting the other crank to the record carrier, an arm carrying a pin normally lying in a plane parallel to the gramophone turntable with the pin above the central spindle of said turntable for holding a record indexed in position thereon, and means for automatically displacing said arm during transfer of a record by said carrier.

5. An automatic gramophone record playing machine including a turntable for supporting a record to be played, a tone-arm, a magazine for holding records, a carrier for displacing records between said turntable and said magazine, a main driving shaft, three countershafts in geared relationship thereto, a crank on one of said shafts continuously rotating therewith, means for displacing the tone-arm radially of the record and independently of its playing operation, links connecting said crank with such means, a further pair of cranks, clutch means coupling one of said cranks at a time to one of the other two countershafts, means for reversing the record on said turntable side for side with respect to the turntable and without interference from said tone-arm, links coupling one of said cranks to said side for side reversal means, links connecting the other crank to the record carrier, trip elements setting the operation of one or other of the said clutches, and a hand-control for said trip elements.

6. An automatic gramophone record playing machine including a turntable for supporting a record to be played, a tone-arm, a magazine for holding records, a carrier for displacing records between said turntable and said magazine, a main driving shaft, three countershafts in geared relationship thereto, a crank on one of said shafts continuously rotating therewith, means for displacing the tone-arm radially of the record and independently of its playing operation, links connecting said crank with such means, a further pair of cranks, clutch means coupling one of said cranks at a time to one of the other two countershafts, means for reversing the record on said turntable side for side with respect to the turntable and without interference from said tone-arm, links coupling one of said cranks to said side for side reversal means and links connecting the other crank to the record carrier, a stop on the crank arm operating the record side for side reversal, and means operated by said stop to disengage the clutch operating the side for side reversal and to throw-in the clutch for the crank displacing the record carrier.

7. An automatic gramophone record playing machine including a turntable for supporting a record to be played, a tone-arm, a magazine for holding records, a carrier for displacing records between said turntable and said magazine, a main driving shaft, three countershafts in geared relationship thereto, a crank on one of said shafts continuously rotating therewith, means for displacing the tone-arm radially of the record and independently of its playing operation, links connecting said crank with such means, a further pair of cranks, clutch means coupling one of said cranks at a time to one of the other two countershafts, means for reversing the record on said turntable side for side with respect to the turntable and without interference from said tone-arm, links coupling one of said cranks to said side for side reversal means and links connecting the other crank to the record carrier, a hand-control for said clutches, and means operated by said hand-control for effecting alternate engagement of the two clutches at each rotation of the main operating crank, thus determining the return of a record to the magazine only after playing of both sides in sequence.

8. An automatic gramophone record playing machine including a turntable for supporting a record to be played, a tone-arm, a magazine for holding records, a carrier for displacing records between said turntable and said magazine, a main driving shaft, three countershafts in geared relationship thereto, a crank on one of said shafts continuously rotating therewith, means for displacing the tone-arm radially of the record and independently of its playing operation, links connecting said crank with such means, a further pair of cranks, clutch means coupling one of said cranks at a time to one of the other two countershafts, means for reversing the record on said turntable side for side with respect to the turntable and without interference from said tone-arm, links coupling one of said cranks to said side for side reversal means, links connecting the other crank to the record carrier, and means for throwing out each clutch on the completion of alternate revolutions of the continuously rotating crank arm.

9. An automatic gramophone record playing machine including a turntable for supporting a record to be played, a tone-arm, a magazine for holding records, a carrier for displacing records between said turntable and said magazine, a main driving shaft, three countershafts in geared relationship thereto, a crank on one of said shafts continuously rotating therewith, means for displacing the tone-arm radially of the record and independently of its playing operation, links connecting said crank with such means, a further pair of cranks, clutch means coupling one of said cranks at a time to one of the other two countershafts, means for reversing the record on said turntable side for side with respect to the turntable and without interference from said tone-arm, links coupling one of said cranks to said side for side reversal means, links connecting the other crank to the record carrier, means for displacing the magazine step by step, and means for operating said magazine displacing means during alternate revolutions only of the crank arm connected by links to the means for displacing said tone-arm.

10. An automatic gramophone record playing machine including a turntable for supporting a record to be played, a tone-arm, a magazine for holding records, a carrier for displacing records between said turntable and said magazine, a main driving shaft, three countershafts in geared relationship thereto, a crank on one of said shafts continuously rotating therewith, means for displacing the tone-arm radially of the record and independently of its playing operation, links connecting said crank with such means, a further pair of cranks, clutch means coupling one of said cranks at a time to one of the other two countershafts, means for reversing the record on said turntable side for side with respect to the turntable and without interference from said tonearm, links coupling one of said cranks to said side for side reversal means, links connecting the other crank to the record carrier, a hand control, and means operated thereby determining the raising or lowering of the magazine in synchronism with the reciprocation of the record carrier to and fro therefrom.

ROBERT WILKINSON.